United States Patent [19]

Takei et al.

[11] Patent Number: 4,566,812
[45] Date of Patent: Jan. 28, 1986

[54] SEALING MEANS FOR A BEARING FOR STRUT-TYPE SUSPENSION

[75] Inventors: Kenji Takei, Hiratsuka; Yukihiro Akabane, Fujisawa, both of Japan

[73] Assignee: Nippon Seiko Kabushiki Kaisha, Tokyo, Japan

[21] Appl. No.: 644,974

[22] Filed: Aug. 27, 1984

[30] Foreign Application Priority Data

Aug. 31, 1983 [JP] Japan ............................. 58-135265[U]

[51] Int. Cl.⁴ .......................... F16C 33/76; F16C 33/58
[52] U.S. Cl. .................................... 384/484; 384/607; 384/615
[58] Field of Search ................ 384/607, 477, 484–488, 384/590, 592, 609, 610, 611, 615, 617, 622, 621; 308/219, 221, 225, 223, 187.1

[56] References Cited

U.S. PATENT DOCUMENTS

| 589,204 | 8/1897 | Cobb | 384/477 |
|---|---|---|---|
| 3,951,482 | 4/1976 | Blaydon | 384/485 |
| 4,120,543 | 10/1978 | Greene, Jr. et al. | 384/607 |
| 4,209,208 | 6/1980 | Olschewski et al. | 384/488 |
| 4,368,932 | 1/1983 | Wolzenburg | 384/622 X |
| 4,400,041 | 8/1983 | Lederman | 384/607 |

Primary Examiner—Stuart S. Levy
Assistant Examiner—Thomas R. Hannon
Attorney, Agent, or Firm—Basile, Weintraub & Hanlon

[57] ABSTRACT

A seal for a rolling bearing 30 applicable to a strut-type suspension has a sealing member 40 of the bearing provided with two lips 43 and 47. The lip 43 is at the radial inner side of the member 40 and slidably contacts the outer face of a piston rod 10. The other lip 47 is at the radial outer side of the sealing member so as to contact the outside surface of either a stationary bearing ring 32 or a holding case 38' therefor. The sealing member is further provided with a coupling head 45 engageable with the radial inner tip end portion of a rotary bearing ring 35 so that the sealing member can be made integral with the bearing 30.

4 Claims, 3 Drawing Figures

PRIOR ART

SEALING MEANS FOR A BEARING FOR STRUT-TYPE SUSPENSION

BACKGROUND OF THE INVENTION

1. Field of the Invention

This invention relates to a sealing means for a rolling bearing for a strut-type suspension. More particularly, the present invention relates to a sealing means for a rolling bearing for a strut-type suspension in which a sealing member of a thrust ball member adapted to be assembled to a piston rod of a shock absorber, engages a radial inner end portion of a rotary bearing ring so as to be integral with the bearing.

2. Prior Art

Strut-type suspensions for a vehicle's wheel, are well known. One such typical construction is shown in FIG. 1 hereof. As shown in FIG. 1, a piston rod or strut shaft 10' of a shock absorber or strut has a stepped shoulder portion 11' upon which is placed the radial inner part of a holding case 38' of a stationary bearing ring 32'. Above the holding case 38' a radial inner part of both a lower plate 14' and an upper plate 13' of a shock absorbing rubber mount 12', as well as a washer 16' are stacked one after another. These stacked members are tightly fixed by a nut 17' coupled to the threaded neck portion of the piston rod 10'.

The shock absorbing rubber mount 12' is, ordinarily, a pre-fabricated sub-assembly consisting of the upper plate 13', the lower plate 14' and a rubber buffer 15'. The rubber buffer 15' is positioned between the upper plate 13' and the lower plate 14'. The rubber buffer 15' is integrally adhered, both to the upper plate 13' and to the lower plate 14', by vulcaniziang. The upper plate 13' is fixedly attached to a mounting plate (not shown) at the side of a vehicle body (not shown).

According to the prior art construction, a rotary bearing ring 35' of a small bearing 30' is disposed on an annular upper seat 18' for a coil spring 19' with a sealing member 40' being interposed therebetween.

The annular upper seat 18' is axially movable relative to the piston rod 10' together with an outer cylinder of the shock absorber (not shown) via the coil spring 19' which is coaxially disposed between a lower spring seat for the coil spring (not shown) and the upper coil spring seat 18', itself. The upper spring seat 18', also, can support a thrust load by the ball bearing 30' when it is rotated, together with the outer cylinder around the piston rod 10'.

Usually, the sealing member 40' comprises a core metal 42' and an elastic member 41', such as a rubber or the like, which are integrally attached by vulcanizing. A radial inner marginal lip 43' and a radial outer marginal lip 47' of the sealing member 40' are slidably contacted with the outer surface of the piston rod 10' and the outer surface of the holding case 38', respectively. This construction prevents any foreign material from entering into the interior of the ball bearing 30'. At the same time, the sealing member 40', also, functions to prevent any leakage of the lubricant applied to the ball bearing 30' either when the coil spring seat 18' moves axially or when it is rotated around the piston rod 10'.

Generally, such prior art sealing means for a bearing for a strut-type suspension are characterized as having a construction comprising lips which are provided at the radial inner part and the outer part of the rolling bearing.

However, since such conventional sealing means are separated ones, in which the sealing member is disposed as a discrete member from the bearing, there are found various drawbacks, such as not only inconvenience in handling and storage but, also, require complicated assembly procedures.

OBJECTS OF THE INVENTION

Accordingly, it is an object of the present invention to provide a sealing member for a strut-type suspension which is integral with the rolling bearings.

SUMMARY OF THE INVENTION

The present invention provides a sealing means for strut-type suspensions having its radial inner lip in contact with the outer surface of the piston rod. A radial outer lip of the sealing means contacts the outer face of either a stationary bearing race or a holding case. The radial inner lip of the sealing member is provided with a portion so formed as to be suitably coupled to the radial inner end portion of the rotary bearing race. In this manner the sealing member can be made integral with the bearing member.

Since this sealing means is constructed integrally with the bearing, by providing a coupling head at the radial inner lip of the sealing member, which engages the radial inner end portion of the rotary bearing ring, there is provided simplification, not only in the handling and storage thereof but, also, in its assembly.

For a more complete understanding of the present invention reference is made to the following detailed description and accompanying drawing. In the drawing like reference characters refer to like parts throughout the several views in which:

DETAILED DESCRIPTION OF THE INVENTION

Figure 2:
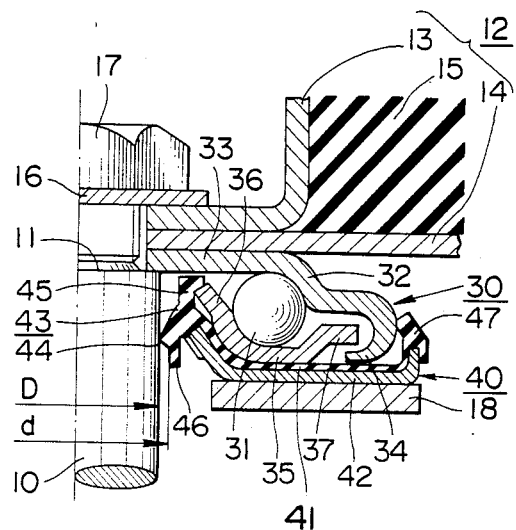
FIG. 2 is a sectional half-side view showing the right half side of an embodiment of the present invention.
Figure 3:
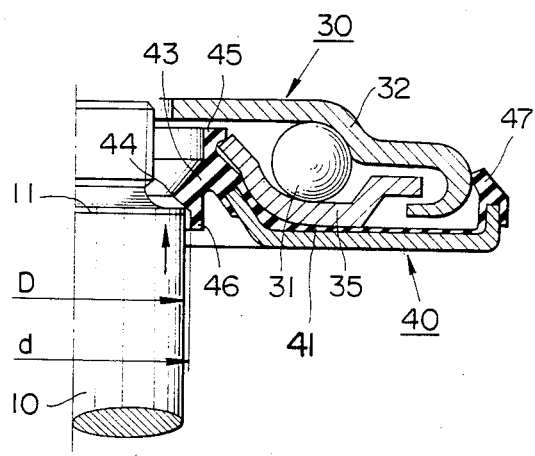
FIG. 3 is a sectional half-side view showing a piston rod being in the state of insertion.

Now, and with reference to the drawing and, in particular, FIGS. 2 and 3, there is depicted therein a bearing or bearing assembly 30. The bearing 30, as shown, is constructed as a shell-type ball bearing comprising a stationary bearing ring 32 and a rotary bearing ring 35. The rings 32 and 35 are fabricated by press forming a steel sheet. A plurality of balls 31, as rolling members, are arrayed between the two bearing rings 32 and 35.

A radial inner marginal portion 33 of the stationary bearing ring 32 extends radially inwardly more than the radial innermost end 36 of the rotary bearing ring 35. The radial outer portion 34 of the stationary bearing ring 32 is bent radially inward so as to be radially and axially overlapped with the radial outer portion 37 of the rotary bearing ring 35. This enables these bearing members to be assembled as a non-separable type bearing.

Integrally incorporated into the bearing 30 is a sealing member 40 according to the present invention.

The basic construction of the sealing member 40 is a reinforced structure formed by adhering a resilient member 41 made of a resilient material, such as rubber, to a core metal 42 by vulcanizing. The radial inner part and the outer part of the resilient member 41 define a lip 43 and a lip 47, respectively.

The lip 43 disposed at the inner side of the sealing member 40 is so formed so as to have an annular coupling heat 45 extending axially upward and an annular projection 46 which extends axially downward.

The coupling head 45 has a tip end projecting radially outward such that it can facilitate coupling of the coupling head 45 with the radial inner end 36 of the rotary bearing ring 35 of the bearing assembly.

The annular projection 46, which has a suitable thickness, extends axially downward from the point radially inward, at a suitable distance from the radially innermost sliding contact end 44 of the inner side lip 43. The inside diameter "d" of the annular projection 46 is made slightly larger than the outside diameter "D" of the piston rod 10.

When the sealing member 40 is assembled to the bearing or bearing assembly 30, the coupling head 45 of the radial inner side lip 43 of the sealing member 40 is coupled over the radial inner end periphery 36 of the rotary bearing ring 35. At the same time, the lip 47 at the radial outer side of the sealing member 40 slidably engages the outer peripheral face of the stationary bearing ring 32. Thus, the bearing 30 and the sealing member 40 is assembled as an integrally coupled construction.

The bearing 30 which has been assembled by integrally incorporating therein the sealing member 40 is fixedly mounted on a stepped shoulder 11 and around the threaded neck of a piston rod 10. The bearing 30 is tightened by a screw nut 17 through a washer 16 after the radial inner part 33 of the stationary bearing ring 32 has been placed between a lower plate 14 and the stepped shoulder 11. In this manner the radial inner end of the stationary bearing ring 32, the lower plate 14 and the upper plate 13 are stacked one after, or atop, another on the shouldered step 11 with their radial innermost ends being axially aligned. Hence, the rotary bearing member 35 is attached so that it is capable of being rotatable, relative to the upper seat plate 18, through the sealing member 40.

When inserting the piston rod 10 into a central opening of the bearing 30 in the direction of an arrow line as shown in FIG. 3 for mounting it as explained above, the radial innermost tip end 44 of the radial inner lip 43 of the sealing member 40 will contact the stepped shoulder 11 of the piston rod 10 and is urged to be raised in the direction of insertion.

The projection 46 projects axially in the direction opposite to that of the direction of insertion, from the point radially outward from the innermost tip end. As noted, the projection 46 has an inside diameter d larger than the outside diameter D of the piston rod 10. Accordingly, the projection 46 will come into slidable contact with the outer surface of the piston rod 10 without being raised up by the stepped shoulder portion 11 of the piston rod 10. This is true even when the innermost tip end 44 of the radial inner side lip 43 of the sealing member 40 could be raised up by the piston rod 10. By virtue of this construction, any undesirable reverse turning of the inner side lip 43 can be prevented from occurring.

It should be noted, as with the prior art constructions, that the stationary bearing ring 32 can be housed within a holding cage secured to the rubber mount 12 or, as shown in FIGS. 2 and 3, can be directly adhered thereto.

Figure 1:
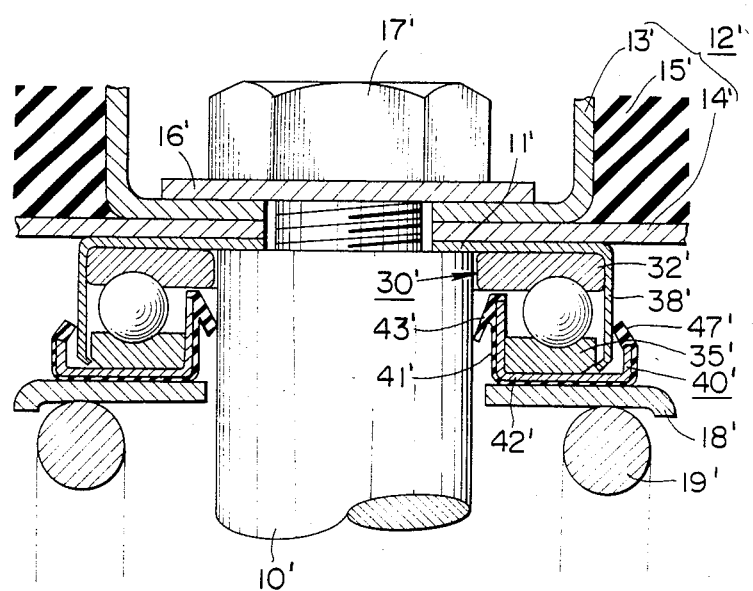
FIG. 1, as noted, is a sectional view, partly in cross-section, showing a conventional sealing means for a strut-type suspension bearing.

Likewise, the unprimed numbered components in FIGS. 2 and 3 refer to similar primed numbered components identified in FIG. 1.

It is to be further noted that while explanation has been made regarding a rolling bearing constructed as a shell-type ball bearing, the present invention can be similarly used as a sealing member applicable to other general type ball bearings.

Having, thus, described the invention, what is claimed is:

1. A sealing means for a rolling bearing for a strut-type suspension comprising:
   a piston rod for a shock absorber, the piston rod having an outer surface;
   a rubber mount fixed to the piston rod, the rubber mount having an upper and a lower plate;
   a coil spring which encircles the piston rod;
   an upper spring for a first end of the coil spring, the upper spring seat being mounted about the piston rod;
   a stationary bearing ring having an arcuate outer radial portion defining an interior curve and a radial inner marginal portion, the marginal portion secured to the piston rod in fixed contact with the lower plate of the rubber mount;
   a rotary bearing ring fixed to the upper spring seat and being rotatable therewith, the rotary bearing ring having a radial inner end portion and a radial outer portion which extend into the interior curve defined by the arcuate outer radial portion of the stationary bearing ring, the rotary bearing ring and the stationary bearing ring cooperating to define a bearing assembly; and
   a sealing member for the bearing assembly integral therewith, the sealing member having (1) a first lip formed at a radial inner side thereof, the first lip slidably contacting the outer surface of the piston rod, the first lip including a coupling head which couples with the radial inner end portion of the rotary bearing ring to render the sealing member integral with the bearing assembly and (2) a second lip formed at the radial outer side of the sealing member, the second lip contacting the stationary bearing ring.

2. The sealing means for a rolling bearing as claimed in claim 1, wherein said sealing member comprises an annular projection having an inside diameter larger than the outside diameter of the piston rod projecting axially in the direction opposite to the direction of insertion of the piston rod in the bearing assembly.

3. The sealing means for a roller bearing as claimed in claim 1 wherein the sealing member comprises a core metal and a resilient member adhered thereto, the resilient member positioned between the core metal and the rotary bearing ring, the first and second lips being formed on the resilient member.

4. A sealing means for a roller bearing for a strut-type suspension comprising:
   a piston rod for a shock absorber, the piston rod having an outer surface;
   a rubber mount fixed to the piston rod, the rubber mount having an upper and a lower plate;
   a coil spring which encircles the piston rod;
   an upper spring seat for a first end of the coil spring, the upper spring seat being mounted about the piston rod;

- a stationary bearing ring having an arcuate outer radial portion, defining an interior curve, and a radial inner marginal portion, the marginal portion secured to the piston rod in fixed contact with the lower plate of the rubber mount;
- a rotary bearing ring fixed to the upper spring seat and being rotatable therewith, the rotary bearing ring having a radial inner end portion and a radial outer portion which extends into the interior curve defined by the arcuate outer radial portion of the stationary bearing ring, the rotary bearing ring and the stationary bearing ring cooperating to define a bearing assembly; and
- a sealing member for the bearing assembly integral therewith, interposed between the upper spring seat and rotary bearing ring, the sealing member having a first lip formed at a radial inner side thereof, the first lip slidably contacting the outer surface of the piston rod, the first lip including a coupling head which couples the radial inner end portion of the rotary bearing ring to render the sealing member integral with the bearing assembly, the first lip further including an annular projection having an inside diameter larger than the outside diameter of the piston rod projecting axially in the direction opposite to the direction of insertion of the piston rod in the bearing assembly, and a second lip formed at the radial outer side of the sealing member, the second lip contacting the stationary bearing ring.

* * * * *